United States Patent
Herzig et al.

(10) Patent No.: US 12,330,496 B2
(45) Date of Patent: Jun. 17, 2025

(54) HOUSING BODY FOR A CHARGING OR FUEL-FILLING FLAP MODULE OF A MOTOR VEHICLE

(71) Applicant: ILLINOIS TOOL WORKS INC., Glenview, IL (US)

(72) Inventors: Jürgen Herzig, Buchbrunn (DE); Matthias Kapaun, Gaukönigshofen (DE); Matthias Hegwein, Ippesheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 285 days.

(21) Appl. No.: 17/947,790

(22) Filed: Sep. 19, 2022

(65) Prior Publication Data

US 2023/0097685 A1    Mar. 30, 2023

(30) Foreign Application Priority Data

Sep. 20, 2021   (DE) .................... 10 2021 124 201.0

(51) Int. Cl.
  *B60K 15/05*   (2006.01)
  *B60L 53/14*   (2019.01)
(52) U.S. Cl.
  CPC .............. *B60K 15/05* (2013.01); *B60L 53/14* (2019.02)
(58) Field of Classification Search
  CPC ................................ B60K 15/05; B60L 53/14
  USPC ...................................................... 296/97.22
  See application file for complete search history.

(56) References Cited

U.S. PATENT DOCUMENTS

2021/0122234 A1*  4/2021  Stack ..................... B60K 15/05

FOREIGN PATENT DOCUMENTS

| CN | 204871246 U | * | 12/2015 | |
| DE | 102011006633 A1 | * | 3/2012 | ............. B60K 15/05 |
| DE | 102017223396 A1 | | 6/2019 | |
| DE | 102020211831 A1 | | 3/2022 | |

OTHER PUBLICATIONS

DE-102011006633-A1 (Kordowski et al.) (Mar. 15, 2012) (Machine Translation) (Year: 2012).*

* cited by examiner

*Primary Examiner* — Mahmoud Gimie
(74) *Attorney, Agent, or Firm* — THOMPSON HINE LLP

(57) ABSTRACT

A housing body (1) is designed in order to be mounted at least in regions in a mounting opening of an outer skin or outer body component (5) of a motor vehicle, and has an outer flange region (6), which surrounds the housing body (1) at least in regions and defines the outer geometry of the housing body at least in regions, the flange region having a multi-dimensional shape and being designed in order to rest against a support surface of the outer skin or outer body component (5) in the installed state of the housing body. The shape of the outer flange region (6) is designed such that the housing body (1) is mountable, as needed, in a mounting opening, mirrored relative to the motor vehicle longitudinal axis, in a left- or right-sided outer skin or outer body component, by moving the housing body from left to right.

19 Claims, 4 Drawing Sheets

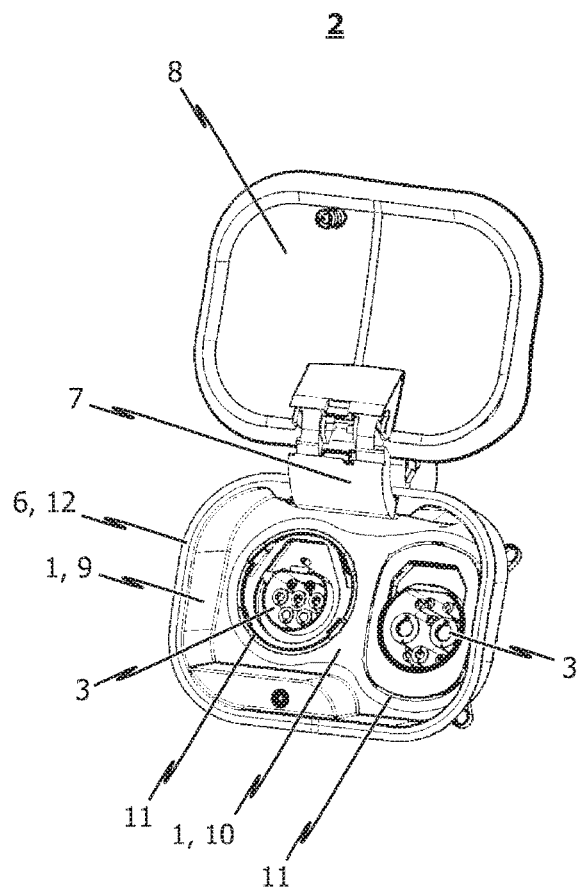
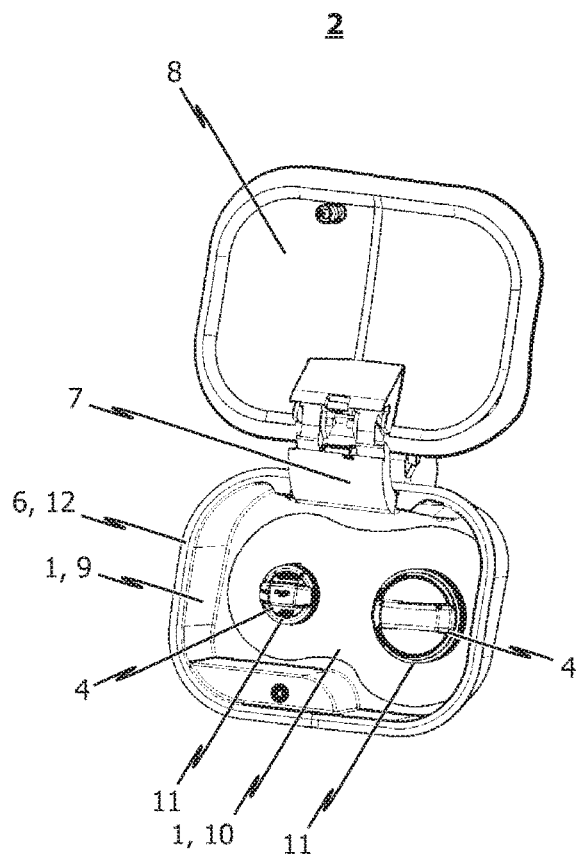
FIG. 1
FIG. 2

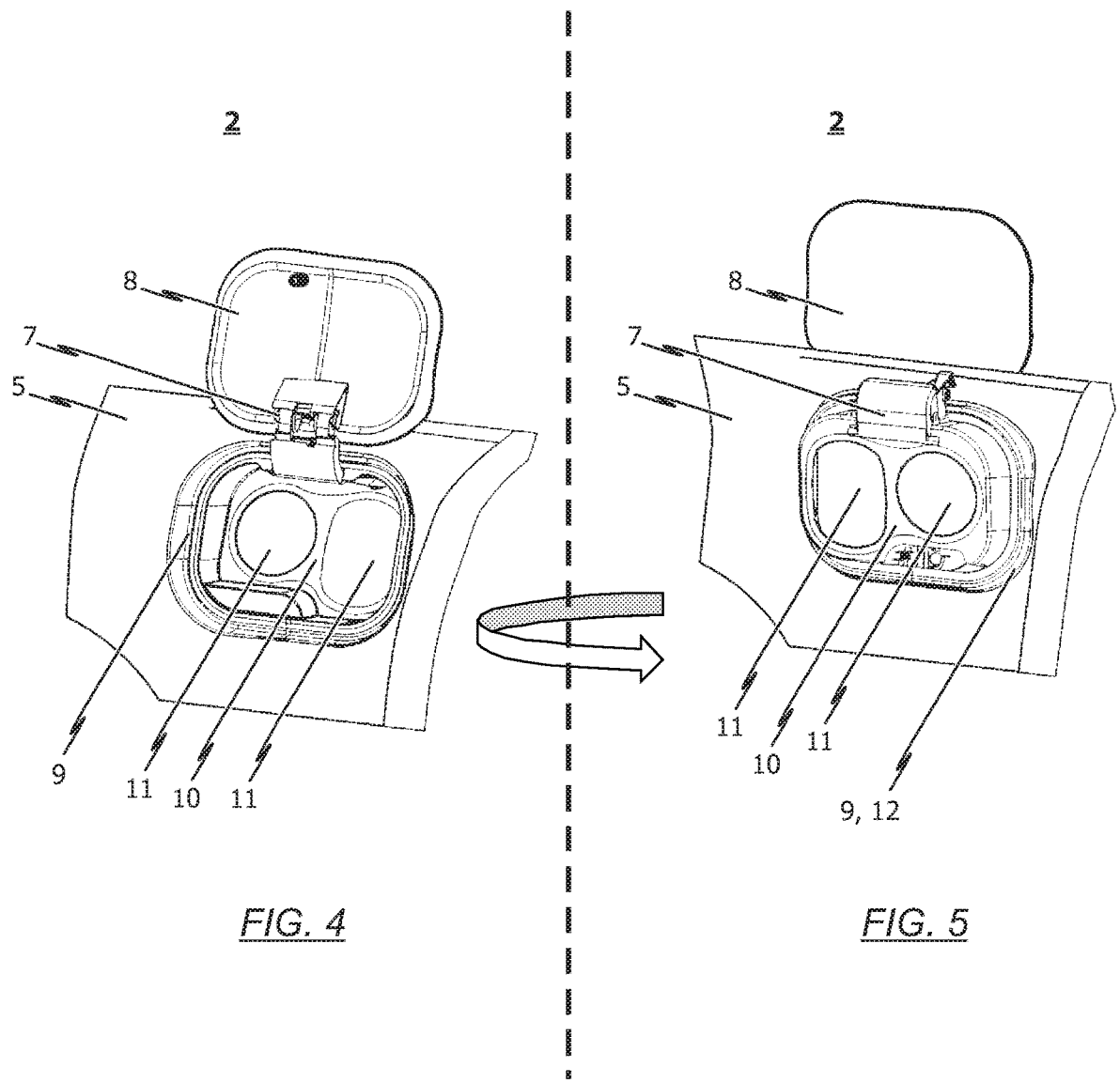

HOUSING BODY FOR A CHARGING OR FUEL-FILLING FLAP MODULE OF A MOTOR VEHICLE

TECHNICAL FIELD

The present invention relates to a housing body for a charging, consumable fluids, or fuel filling flap module of a vehicle. The vehicle is in particular a vehicle having a hybrid or electric drive, wherein however vehicles having a purely combustion-based drive are not excluded in the context of the present invention.

BACKGROUND

Vehicles with a hybrid or electric drive have at least one battery or traction battery, which, for example in the case of PHEV vehicles (PHEV=plug-in hybrid electric vehicle) or BEV vehicles (BEV=battery electric vehicle), can be charged via an electrical charging connector that is accessible from the outside on the vehicle body, and is typically a charging port, by connecting to an electrical charging station, for example, or a conventional external electrical terminal.

The charging port is usually arranged in a charging compartment of the vehicle body, which is covered or closed by a charging flap or a charging closure element. A mechanism that cooperates with the charging flap or charging closure element selectively allows the charging compartment to be opened and closed or the charging flap or charging closure element to be flipped open and closed relative to the charging compartment, and thus allows access to the charging port.

In internal combustion engine driven vehicles, a fuel tank is supplied with fuel via a tank filler neck, which is accessible from the outside by connection to a fuel pump or a fuel nozzle, for example. Like the charging port, the filler neck is typically arranged in a filler neck housing that is associated with the vehicle body and is covered or closed by a fuel flap or a tank closure element. Here too, a mechanism that cooperates with the fuel flap or the tank closure element selectively allows the filler neck housing to be opened and closed or the fuel flap or the tank closure element to be flipped open and closed relative to the filler neck housing, and thus allows access to the filler neck.

At this point, it is noted that the invention is not limited to fuel filler housing bodies that accommodate a fuel filler nozzle. Rather, the invention also relates to housing bodies wherein a consumable fluid filler neck can be accommodated in the housing body. Consumable fluids include, for example, water or AdBlue.

Furthermore, housing bodies may also be employed for applications such as wiping water tanks or water tanks for feeding water in internal combustion engines to increase performance/efficiency or to supply other additives.

The housing body of such a charging, consumable fluids, or fuel filler housing is accommodated, and fixed accordingly, in a mounting opening of an outer skin or outer body component of the vehicle. Such outer skin or outer body components typically exhibit a uniform curvature. Accordingly, the housing body or the geometry of an outer flange region at least regionally surrounding the housing body and at least regionally defining the outer geometry of the housing body must be adapted to the surface or uniform curvature of the corresponding outer skin or outer body component of the vehicle. Otherwise, an in particular unavoidable flush integration of the charging, consumable fluids, or fuel flap module with Class A surfaces is not possible. A flush integration with Class A surfaces is to be understood herein as an arrangement wherein a charging or fuel flap associated with the housing body is in the shut or closed state arranged flush with the Class A surface of the outer skin or the surface of the outer body.

Because the outer surface of a vehicle, i.e., the outer skin or outer body, i.e., the visible (free-form) surface typically has a uniform curvature, it is necessary with regard to the housing body of a charging, consumable fluids, or fuel housing body system to adjust said housing body individually for each vehicle application. In particular, the housing body and the shape of the outer flange region at least regionally surrounding the housing body and at least regionally defining the outer geometry of the housing body must be adapted specifically to the outer skin, and in particular the curvature consistency of the outer skin.

Until now, this condition has prevented the development and cost-effective production of customized solutions with reasonable effort based on a standardized product base.

SUMMARY

Given this problem, the object of the invention is to specify a housing body for a charging, consumable fluids, or filler neck compartment system of a vehicle, wherein this housing body can be integrated in the vehicle body even when different boundary conditions, in particular installation situations, apply. In particular, a housing body is to be specified based on which product solutions that are specifically adapted to the customer's needs can be implemented.

Accordingly, the invention relates in particular to a housing body for a charging, consumable fluids, or filler neck compartment system of a vehicle, wherein at least one charging port and/or at least one fuel or consumable fluids filler neck is mounted or mountable in the housing body, wherein the housing body is adapted to be mounted at least regionally in a mounting opening of an outer skin or outer body component of a vehicle. The housing body comprises an outer flange region at least regionally surrounding the housing body and at least regionally defining the outer geometry of the housing body, said outer flange region adapted to rest in the installed state of the housing body on a support surface of the outer skin or outer body component. The invention in particular provides that the outer flange region of the housing body at least regionally defining the outer geometry of the housing body has a multi-dimensional and in particular three-dimensional shape.

The multi-dimensional and in particular three-dimensional shape of the outer flange region at least regionally defining the outer geometry of the housing body is in particular adapted to the curvature consistency of the outer skin or outer body component in the area of the mounting opening.

Due to the special design of the multi-dimensional and in particular three-dimensional shape of the outer flange region, which at least regionally defines the outer geometry of the housing body, the housing body is intended to be mounted in a left-sided outer skin or outer body component and also in a right-sided outer skin or outer body component of the vehicle.

In other words, the housing body has an outer geometry that is suitable for both left-side and right-side installation in the outer skin or outer body component of the vehicle. The left- and right-sided outer skin or outer body components of the vehicle are adapted to be mirror-symmetrical with respect to the vehicle longitudinal axis. Due to the mirror-symmetrical design of the multi-dimensional and in particular three-dimensional shape of the outer flange region of the housing body, the flange region is adapted to the curvature consistency of the left-sided and the right-sided outer skin or outer body component of the vehicle.

This ensures that the housing body or the outer flange region of the housing body always rests on the support surface of the outer skin or outer body component, regardless of whether the mounting opening for the housing body is adapted in the right-sided or left-sided outer skin or outer body component. The housing body according to the invention thus represents a standard module with which individual customer requirements can be realized with regard to the installation side of the charging, consumable fluids, or filler neck compartment system.

In particular the shape of the outer flange region at least regionally defining the outer geometry of the housing body is adapted mirror-symmetrically such that the housing body is mountable, as needed, in a mounting opening, mirrored in particular relative to the motor vehicle longitudinal axis, in a left- or right-sided outer skin or outer body component, specifically by repositioning the housing body from left to right.

According to realizations of the invention, the shape of the outer flange region defining the outer geometry of the housing body at least in regions is adapted such that, by rotating the housing body, in particular by 180°, relative to a preferably vertical rotary axis, the housing body is mountable, as needed, in a mounting opening, mirrored in particular relative to the vehicle longitudinal axis, in a left- or right-sided outer skin or outer body component, as intended.

The expression "mountable as intended" used herein is defined as a mounting situation wherein the outer flange region of the housing body at least regionally defining the outer geometry of the housing body rests preferably with its entire surface on the support surface of the outer skin or outer body component.

The support surface of the outer skin or outer body component is in particular formed by at least one frame formed, for example, in the course of a deep drawing process, and/or by at least one bottom region formed, for example, in the course of a deep drawing process.

The housing body is preferably adapted to be connected to the outer skin or outer body component, and in particular to the support surface of the outer skin or outer body component, by means of a form-fit, force-fit, and/or material-fit connection, in particular via its outer flange region.

Implementations of the inventive housing body provide for compensation of any manufacturing tolerances in that the housing body comprises at least one support adapter arranged or arrangeable, in particular, as needed, between the outer flange region and the support surface of the outer skin or outer body component, in particular to locally adjust a spacing between the support surface of the outer skin or outer body component and the outer flange region of the housing body.

The housing body in particular has at least one adapter that is arranged or arrangeable, as needed, between the outer flange region and the support surface of the outer shell or outer body component, in particular for local adjustment of a spacing between the support surface of the outer skin or outer body component and the outer flange region and/or, in particular, for bridging an interstice between an edge and/or bottom region of the support surface of the outer shell or outer body component and the outer flange region.

Preferably, a mechanism for manipulating a charging or fuel flap relative to the housing body is associated with the housing body, the mechanism being adapted to move and/or swing the charging or fuel flap upward relative to the housing body in the installed state of the housing body.

This ability to move or swing the charging or fuel flap upward relative to the housing body ensures that the mechanism for manipulating the charging or fuel flap can also be adopted when the housing body is optionally mounted in a mounting opening of a right-sided or a left-sided outer skin or outer body component.

The mechanism is preferably adapted to move the charging or fuel flap relative to the housing body between a closed position and an open position, wherein the charging or fuel flap is preferably arranged flush with the class A surface of the outer skin or outer body component in the closed position of the charging or fuel flap. However, due to the curvature consistency of the outer skin or outer body component, a different charging or fuel flap is to be selected in a left-sided arrangement of the housing body as compared to a right-sided arrangement.

In this respect, the mechanism for manipulating the charging or fuel flap relative to the housing body should have an interface for interchangeably attaching the charging or fuel flap.

Realizations of the inventive housing body comprise an outer housing body region with the outer flange region at least regionally surrounding the housing body and at least regionally defining the outer geometry of the housing body and an inner housing body region surrounding the outer housing body region. The inner housing body region is adapted to surround at least one through-hole into which a charging port and/or a fuel or consumable fluids filler nozzle is mounted or mountable.

Further embodiments of this design provide that the inner housing body region is adapted to accommodate, optionally or as needed, a different number and/or arrangement of charging ports and/or fuel or consumable fluid filler nozzles. In this way, a particularly high variety of variants can be achieved with the housing body.

It is for example conceivable that the inner housing body region is adapted to be at least regionally detachable, and in particular exchangeable, with the outer housing body region, namely in the form of an exchangeable insert.

Alternatively or additionally thereto, it is conceivable that the inner housing body region comprises at least one opening into which a charging port and/or a fuel or consumable fluids fuel filler can be mounted as needed. In particular, the at least one mounting region, which can be opened as needed, can be embodied as a pull-away region. Of course, other solutions for realizing the mounting area, which can be opened, are also conceivable in this case.

With regard to the outer housing body region, it is conceivable that the outer housing body region has a sealing region that is provided on the outer flange region and adapted to form a seal when abutting the mounting opening and in particular when abutting the support surface of the outer skin or outer body component. Preferably, the sealing region is integrally formed with the outer housing body in an injection molding process.

The invention also relates to a charging, consumable fluids, or fuel filler nozzle for insertion into a body opening of a vehicle, wherein the charging, consumable fluids, or fuel filler nozzle comprises a housing body of the inventive type as described above.

The invention further relates to a vehicle having such a charging, consumable fluids, or fuel filler housing body.

BRIEF DESCRIPTION OF THE DRAWINGS

Exemplary embodiments of the inventive solution are described in further detail below with reference to the enclosed drawings.

These show in:

FIG. 1 a schematic and isometric side view of a charging, consumable fluids or filler neck compartment system having an exemplary embodiment of the inventive housing body, wherein two charging port systems are mounted in the housing body;

FIG. 2 a schematic and isometric side view of a charging, consumable fluids, or filler neck compartment system of a vehicle with the housing body of the charging, consumable fluids, or filler neck system according to FIG. 1, however, wherein two fuel or consumable fluids filler necks are mounted in the housing body;

FIG. 4 a schematic and isometric side view of an exemplary embodiment of a charging, consumable fluids, or filler neck compartment system having a housing body mounted in a mounting opening of a left-sided outer skin or outer body component of a vehicle;

FIG. 5 a schematic and isometric side view of the charging, consumable fluids, or filler neck compartment system according to FIG. 4, but wherein this time the housing body is mounted in a mounting opening of a right-sided outer skin or outer body component of the vehicle;

DETAILED DESCRIPTION

Figure 3:
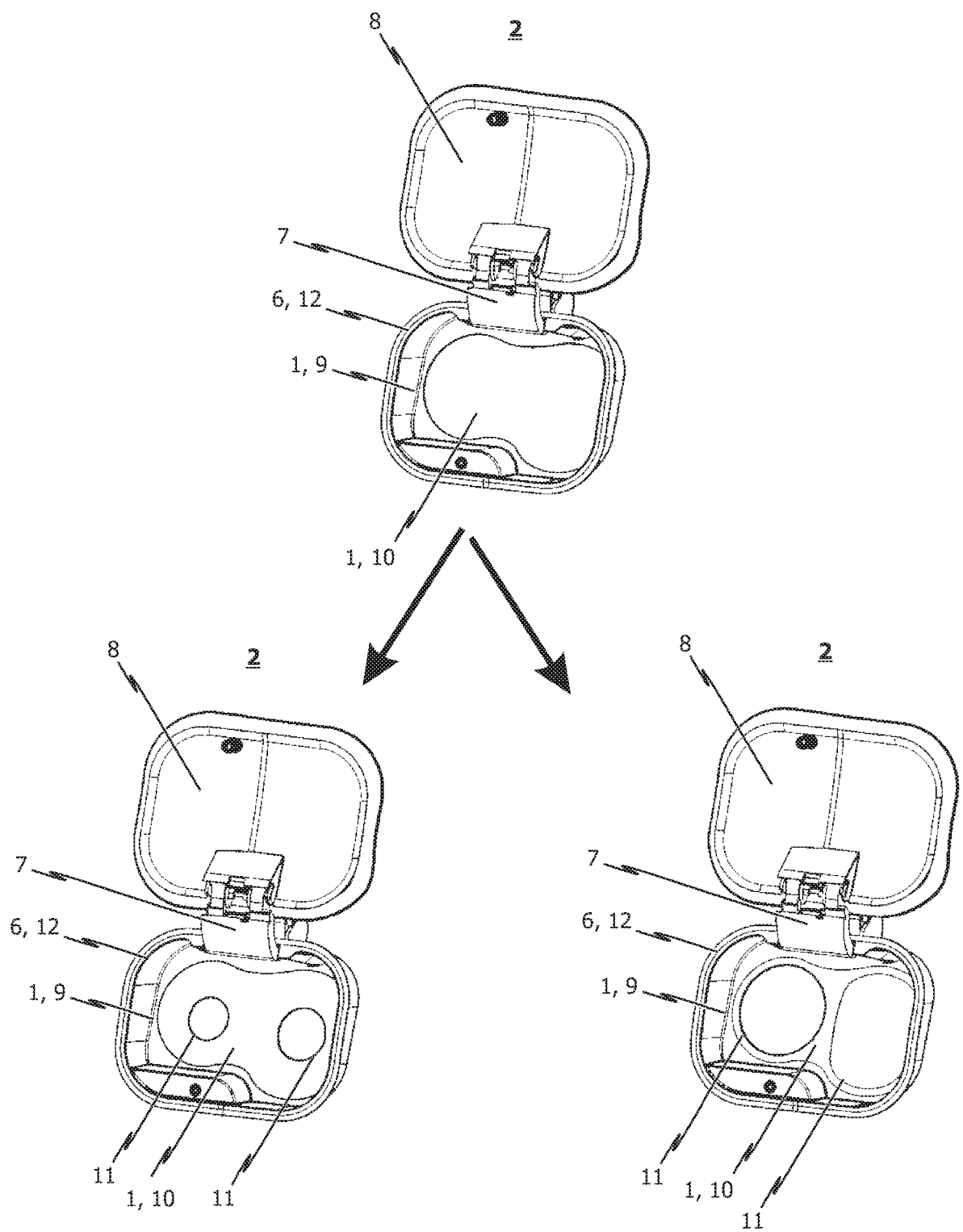
FIG. 3 schematic isometric side views of the charging, consumable fluids, or filler neck compartment system according to FIG. 1 and FIG. 2, but without charging ports or fuel or consumable fluids filler necks mounted in the housing body.

The charging, consumable fluids, or filler neck compartment systems 2 shown in the drawings comprise a housing body 1 adapted to accommodate at least one charging port 3, for example a charging socket, and/or at least one fuel or consumable fluids filler neck 4. For a visual representation of a current state of charge, a corona ring can be arranged around the charging port 3 by means of which different colors can be displayed.

The charging, consumable fluids, or filler neck compartment systems 2 shown in the drawings further comprise a charging or fuel flap system. The charging or fuel flap system comprises a charging or fuel flap 8, which facilitates access through the outer skin 5 of the vehicle to the at least one charging port 3 or the at least one fuel or consumable fluids filler neck 4.

The charging, consumable fluids, or filler neck compartment systems 2 are characterized by a special housing body 1, which has the same geometry in all charging, consumable fluids, or filler neck compartment systems 2 and is adapted to the geometry of a mounting opening formed in the outer skin or outer body component 5 of the vehicle, regardless of whether the mounting opening is embodied in a left-sided outer skin or outer body component 5 of the vehicle, or in a mounting opening of a right-sided outer skin or outer body component 5 mirrored with respect to the longitudinal axis of the vehicle.

For this purpose, the housing body 1 comprises an outer flange region 6 that at least regionally surrounds the housing body 1 and defines the outer geometry of the housing body 1, said outer flange region 6 being adapted to rest on a support surface of the outer skin or outer body component 5 in the installed state of the housing body 1.

In particular, the support surface of the outer skin or outer body component 5 is formed by at least one frame edge region formed in particular in the course of a deep-drawing operation, wherein the frame edge region is arranged in an inwardly offset manner with respect to the outer surface of the outer skin or outer body component 5 and at least regionally surrounds the mounting opening of the outer skin or outer body component 5.

The outer flange region 6, which at least regionally defines the outer geometry of the housing body 1, has an outer geometry adapted for both left-sided and right-sided installation of the housing body 1.

In particular, the outer flange region 6 has a multi-dimensional and in particular three-dimensional shape adapted to the curvature and in particular the curvature consistency of the outer surface of the outer skin or outer body component 5 in the area of the mounting opening. The multi-dimensional and in particular three-dimensional shape of the outer flange region, which at least regionally defines the outer geometry of the housing body 1, is adapted to be symmetrically mirrored relative to an in particular vertical plane.

As can in particular be seen in the illustrations in FIG. 4 and FIG. 5, the shape of the outer flange region 6 at least regionally defining the outer geometry of the housing body 1 is adapted mirror-symmetrically such that—by rotating the housing body (1), in particular by 180°, relative to a preferably vertical axis of rotation—the housing body 1 can be mounted as intended in a left- or right-sided outer skin or outer body component 5, as needed, in a mounting opening, mirrored in particular relative to the motor vehicle longitudinal axis.

Although not explicitly shown in the drawings, the housing body 1 is adapted by means of a form-fit, force-fit, and/or material-fit connection, in particular via its outer flange region 6 to be connected to the outer skin or outer body component 5, and in particular to the support surface of the outer shell or outer body component 5.

To be able to compensate for any existing dimensional tolerances and/or installation tolerances between the outer flange region 6 of the housing body 1 and the support surface of the outer skin or outer body component 5, preferred implementations of the inventive housing body 1 provide that the latter comprises at least one support adapter arranged, or arrangeable as needed, between the outer flange region 6 and the support surface of the outer skin or outer body component 5, in particular to locally adjust a spacing between the support surface of the outer skin or outer body component 5 and the outer flange region 6 of the housing body 1.

The support adapters typically have a thickness of between 0.1 and 1.5 mm, in particular a thickness of about 0.5 mm.

As already indicated, the housing body 1 is associated with a mechanism 7 for manipulating a charging or fuel flap 8 relative to the housing body 1.

In the exemplary embodiments of the charging, consumable fluids, or filler neck compartment systems 2 shown in the drawings, the mechanism 7 is in particular adapted to move and/or swing the charging or fuel flap 8 upward relative to the housing body 1 in the installed state of the housing body 1.

In particular, the mechanism 7 is adapted to move the charging or fuel flap 8 relative to the housing body 1 between a closed position and an open position, wherein, in the closed position of the charging or fuel flap 8, the latter is preferably arranged flush with the Class A surface of the outer skin or outer body component 5.

As can in particular be seen in FIG. 3, the housing body 1 comprises an outer housing body region 9 with the outer flange region 6, which at least partially surrounds the housing body 1 and at least partially defines the outer geometry of the housing body 1, as well as an inner housing body region 10, which surrounds the outer housing body region 9. The inner housing body region 10 surrounds at least one through-opening 11 into which a charging port 3 and/or a fuel or consumable fluids filler neck 4 is mounted or mountable.

The inner housing body region 10 is in particular adapted to accommodate, optionally or as needed, a varying number and/or arrangement of charging ports 3 and/or fuel or consumable fluid filler nozzles 4.

In this context, it is conceivable that the inner housing body region 10 is adapted to be at least regionally detachable, and in particular exchangeable, with the outer housing body region 9, namely in the form of an exchangeable insert.

Alternatively or additionally, the inner housing body region 10 can comprise at least one mounting area 11 in which a charging port 3 and/or a fuel or consumable fluids filler neck 4 can be mounted. The at least one mounting region, which can be opened as needed, can be embodied as a pull-away region.

The outer housing body region 9 of the housing body 1 comprises a sealing region 12, which is provided on the outer flange region 6 and is adapted to form a seal when abutting the mounting opening of the outer skin or outer body component 5. Preferably, the sealing region 12 is integrally formed with the outer housing body 1 in an injection molding process.

Figure 6A:
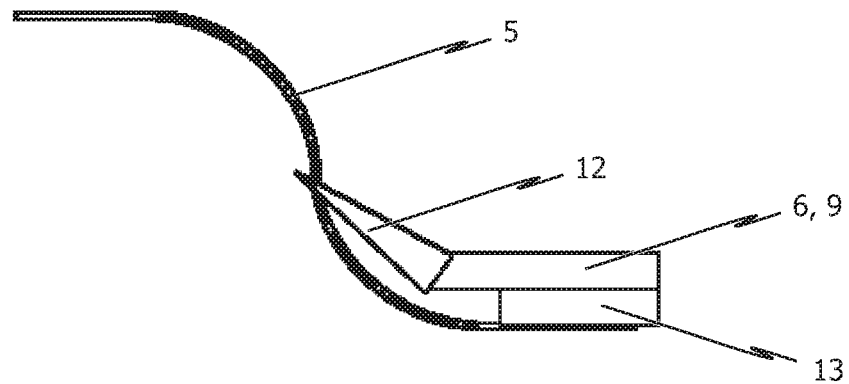
FIG. 6A a schematic illustration of the outer flange region of an exemplary embodiment of the inventive housing body in a left-sided outer skin or outer body component of a vehicle.
Figure 6B:
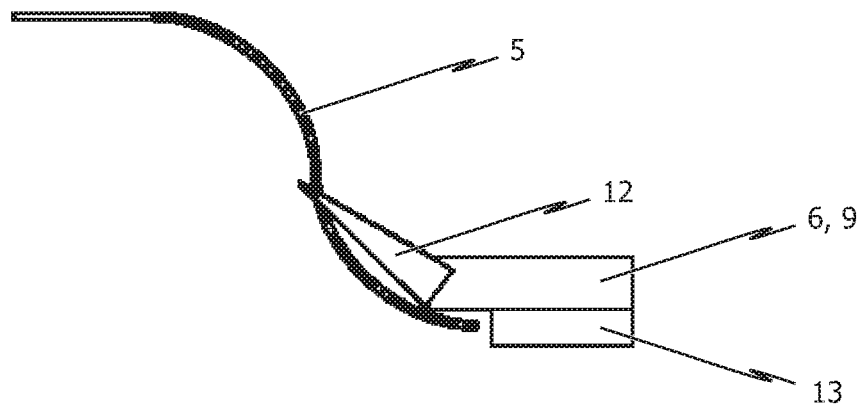
FIG. 6B a schematic illustration of the outer flange region of the housing body according to FIG. 6A in a state wherein the housing body is mounted in a right-sided outer skin or outer body component.

FIG. 6A schematically shows the outer flange region 6 of an exemplary embodiment of the inventive housing body 1 in a left-sided outer skin or outer body component 5 of a vehicle, whereas FIG. 6B schematically shows the outer flange region 6 of the housing body 1 according to FIG. 6A in a state wherein the housing body is mounted in a right-sided outer skin or outer body component.

As indicated schematically in FIG. 6A and FIG. 6B, the outer flange region 6 of the housing body 1 is preferably provided with a surrounding sealing region 12 embodied as a sealing lip which, in the state when the housing body 1 is mounted in the outer skin or outer body component 5, abuts and forms a seal against the frame in particular formed in the course of a deep-drawing operation.

Further, an adapter 13 is formed or adapted on the outer flange region 6 of the housing body to compensate for different support regions in the mounting opening of the outer skin or outer body component 5. The adapter 13 can in particular be embodied as a surrounding edge region around the outer flange region 6 of the housing body 1. But it is also conceivable that corresponding adapters 13 are only partially arranged on the outer flange region 6 of the housing body 1.

The adapter 13 or the adapters 13 are adapted as compensating support for the housing body 1 on the support surfaces of the outer skin or outer body component 5, in particular the bottom region, in particular to locally adjust a spacing between the support surface of the outer skin or outer body component 5 and the outer flange region 6 and/or to bridge a gap between an edge region and/or bottom region of the support surface of the outer skin or outer body component 5 and the outer flange region 6.

As can be seen in FIG. 6A and FIG. 6B, the bottom region in FIG. 6A (in reference to the frame) is larger than in FIG. 6B. This difference is obtained, e.g., by deliberately varying the sheet metal cut-out or the sheet metal punch-out before or after the deep drawing process. These bottom regions projecting at different lengths radially into the opening allows the adapter 13 to rest on the bottom region in a left-handed mounting orientation of the housing body 1 (as shown in FIG. 6A), and thus allows the adapter 13 to locally define the installation depth of the housing body there, whereas in FIG. 6B, that is to say when the housing body 1 is in a right-handed mounting orientation, the adapter 13 projects deeper into the opening adjacent to the bottom region, and only a portion of the housing body 1 locally abuts the bottom region adjacent to the adapter 13 there and locally defines the mounting depth of the housing body 1 there.

The adapter 13 is therefore adapted to compensate for geometric restrictions (e.g., due to the specification as to how the outer side of the housing body 1 or the charging/fuel flap 8 must be in particular topographically shaped/designed, and due to the specification that a flush surface transition is formed to the adjacent vehicle outer skin) when shaping the housing body 1, the geometric restrictions having the effect that 100% symmetry is not achievable in the required support regions. Further, e.g., any systematic tolerance or manufacturing-related deviations between the configuration of the mounting opening in the left vehicle side and the configuration of the mounting opening in the right vehicle side can thus be compensated.

The support adapter or support adapters generally have a thickness (Y-direction in FIG. 6A and FIG. 6B) of between 0.1 and 1.5 mm, and in particular a thickness of about 0.5 mm.

The support adapter 13 or the support adapters 13 can be embodied as a support disc, support ring, support dimple, or support web and can be molded on the lower side of the outer flange region 6 or can be molded together with the housing body 1 during the injection molding operation.

But it is also conceivable in this context that the support adapters 13 or the support adapter 13 are/is not integrally formed with the outer flange region 6 but are/is instead subsequently mounted, e.g., are/is mounted to the bottom region or the flange region, or locally incorporated into the opening by deforming the sheet metal forming the bottom region.

Preferably, a mounting system for the housing body 1 also comprises an aspect of the invention, consisting of the housing body as well as one or more adapters or consisting of the housing body and an outer skin/outer body component having a mounting opening comprising a frame and a bottom region, wherein one or more adapters are formed/incorporated into the bottom region.

The invention is not limited to the embodiments shown in the drawings, but rather results when all of the features disclosed herein are considered together.

LIST OF REFERENCE NUMERALS

1 Housing body
2 Charging/filler neck compartment system
3 Charging port
4 Fuel nozzle
5 Outer skin/outer body component
6 Outer flange region of the housing body
7 Mechanism for manipulating a charging/fuel flap
8 Charging/fuel flap
9 Outer housing body region
10 Inner housing body region
11 Through-opening in the inner housing body region
12 Sealing region
13 Support adapter

The invention claimed is:

1. A housing body for a charging, consumable fluids, or filler neck compartment system of a motor vehicle, wherein at least one charging port and/or at least one fuel nozzle is mounted or mountable in the housing body, wherein the housing body is designed in order to be mounted at least in regions in a mounting opening of an outer skin or outer body component of a motor vehicle, wherein the housing body has an outer flange region, which surrounds the housing body at least in regions and defines the outer geometry of the housing body at least in regions, said outer flange region having a multi-dimensional shape and being designed in order to rest against a support surface of the outer skin or outer body component in the installed state of the housing body, wherein the shape of the outer flange region defining the outer geometry of the housing body is designed at least in regions such that the housing body is mountable, as needed, in a mounting opening, mirrored relative to the motor vehicle longitudinal axis, in a left- or right-sided outer skin or outer body component, namely by moving the housing body from left to right;
wherein the shape of the outer flange region defining the outer geometry of the housing body is configured so as to be symmetrically mirrored relative to a vertical plane;
wherein the shape of the outer flange region defining the outer geometry of the housing body at least in regions is arranged such that, by rotation of the housing body relative to a vertical rotary axis, the housing body is mountable, as needed, in a mounting opening, mirrored relative to the motor vehicle longitudinal axis, in a left-sided or right-sided outer skin or outer body component.

2. The housing body according to claim 1,
wherein the support surface of the outer skin or outer body component is formed by at least one frame formed in the course of a deep drawing process and/or by at least one bottom region formed in the course of a deep drawing process.

3. The housing body according to claim 1, wherein the housing body is designed in order to be connected to the support surface of the outer skin or outer body component, by means of a form-fit, force-fit, and/or material-fit connection, via its outer flange region.

4. The housing body according to claim 2, wherein the housing body has at least one adapter, which is arranged or arrangeable, as needed, between the outer flange region and the support surface of the outer skin or outer body component for local adjustment of a spacing between the support surface of the outer skin or outer body component and the outer flange region and/or for bridging an interstice between an edge and/or bottom region of the support surface of the outer skin or outer body component and the outer flange region.

5. The housing body according to claim 4,
wherein the adapter rests against the bottom region when installed as intended in the left-sided outer skin or outer body component, while, when installed as intended in the right-sided outer skin or outer body component, does not rest against the bottom region; or
wherein the adapter does not rest against the bottom region when installed as intended in the left-sided outer skin or outer body component, while, when installed as intended in the right-sided outer skin or outer body component, it rests against the bottom region.

6. The housing body according to claim 1, wherein a mechanism for manipulating a charging or fuel flap relative to the housing body is associated with the housing body, wherein the mechanism is designed in order to move and/or pivot the charging or fuel flap upward relative to the housing body in the installed state of the housing body, wherein the mechanism is designed in order to move the charging or fuel flap relative to the housing body between a closed position and an open position, wherein, in the closed position of the charging or fuel flap, the charging or fuel flap is arranged to be flush with the outer skin or outer body component.

7. The housing body according to claim 1, wherein the housing body has an outer housing body region with the outer flange region surrounding the housing body at least in regions and defining the outer geometry of the housing body at least in regions and an inner housing body region surrounded by the outer housing body region, wherein the inner housing body region surrounds at least one through-opening, into which a charging port and/or a fuel nozzle is received or receivable.

8. The housing body according to claim 7, wherein the inner housing body region is designed in order to receive, optionally or as needed, a different number and/or arrangement of charging ports and/or fuel nozzles.

9. The housing body according to claim 8,
wherein the inner housing body region is designed in order to be detachable from the outer housing body region, namely in the form of an exchangeable insert.

10. The housing body according to claim 7, wherein the inner housing body region has at least one receptacle region that can be opened as needed and in which a charging port and/or a fuel nozzle is receivable, wherein the at least one receptacle region that can be opened as needed is adapted as a tear-away region.

11. The housing body according to claim 7, wherein the outer housing body region has a sealing region, which is provided on the outer flange region and is designed in order to sealingly abut the mounting opening of the outer skin or outer body component, wherein the sealing region is integrally formed with the outer housing body in an injection process.

12. A charging or fuel-filling housing for insertion into a body opening of a motor vehicle having a housing body according to claim 1.

13. A motor vehicle having a charging or fuel-filling housing according to claim 12.

14. A housing body for a charging, consumable fluids, or filler neck compartment system of a motor vehicle, wherein at least one charging port and/or at least one fuel nozzle is mounted or mountable in the housing body, wherein the housing body is designed in order to be mounted at least in regions in a mounting opening of an outer skin or outer body component of a motor vehicle, wherein the housing body has an outer flange region, which surrounds the housing body at least in regions and defines the outer geometry of the housing body at least in regions, said outer flange region having a multi-dimensional shape and being designed in order to rest against a support surface of the outer skin or outer body component in the installed state of the housing body, wherein the shape of the outer flange region defining the outer geometry of the housing body is designed at least in regions such that the housing body is mountable, as needed, in a mounting opening, mirrored relative to the motor vehicle longitudinal axis, in a left- or right-sided outer skin or outer body component, namely by moving the housing body from left to right;

- wherein the housing body has at least one adapter, which is arranged or arrangeable, as needed, between the outer flange region and the support surface of the outer skin or outer body component for local adjustment of a spacing between the support surface of the outer skin or outer body component and the outer flange region and/or for bridging an interstice between an edge and/or bottom region of the support surface of the outer skin or outer body component and the outer flange region.

15. The housing body according to claim 14,
- wherein the adapter rests against the bottom region when installed as intended in the left-sided outer skin or outer body component, while, when installed as intended in the right-sided outer skin or outer body component, does not rest against the bottom region; or
- wherein the adapter does not rest against the bottom region when installed as intended in the left-sided outer skin or outer body component, while, when installed as intended in the right-sided outer skin or outer body component, it rests against the bottom region.

16. The housing body according to claim 14, wherein a mechanism for manipulating a charging or fuel flap relative to the housing body is associated with the housing body, wherein the mechanism is designed in order to move and/or pivot the charging or fuel flap outward and vertically upward to a position above the housing body.

17. A charging or fuel-filling housing for insertion into a body opening of a motor vehicle having a housing body according to claim 14.

18. A motor vehicle having a charging or fuel-filling housing according to claim 17.

19. A housing body for a charging, consumable fluids, or filler neck compartment system of a motor vehicle, wherein at least one charging port and/or at least one fuel nozzle is mounted or mountable in the housing body, wherein the housing body is designed in order to be mounted at least in regions in a mounting opening of an outer skin or outer body component of a motor vehicle, wherein the housing body has an outer flange region, which surrounds the housing body at least in regions and defines the outer geometry of the housing body at least in regions, said outer flange region having a multi-dimensional shape and being designed in order to rest against a support surface of the outer skin or outer body component in the installed state of the housing body, wherein the shape of the outer flange region defining the outer geometry of the housing body is designed at least in regions such that the housing body is mountable, as needed, in a mounting opening, mirrored relative to the motor vehicle longitudinal axis, in a left- or right-sided outer skin or outer body component, namely by moving the housing body from left to right;

- wherein the shape of the outer flange region defining the outer geometry of the housing body is configured so as to be symmetrically mirrored relative to a vertical plane;
- wherein the support surface of the outer skin or outer body component is formed by at least one frame formed in the course of a deep drawing process and/or by at least one bottom region formed in the course of a deep drawing process.

* * * * *